United States Patent Office 3,186,723
Patented June 1, 1965

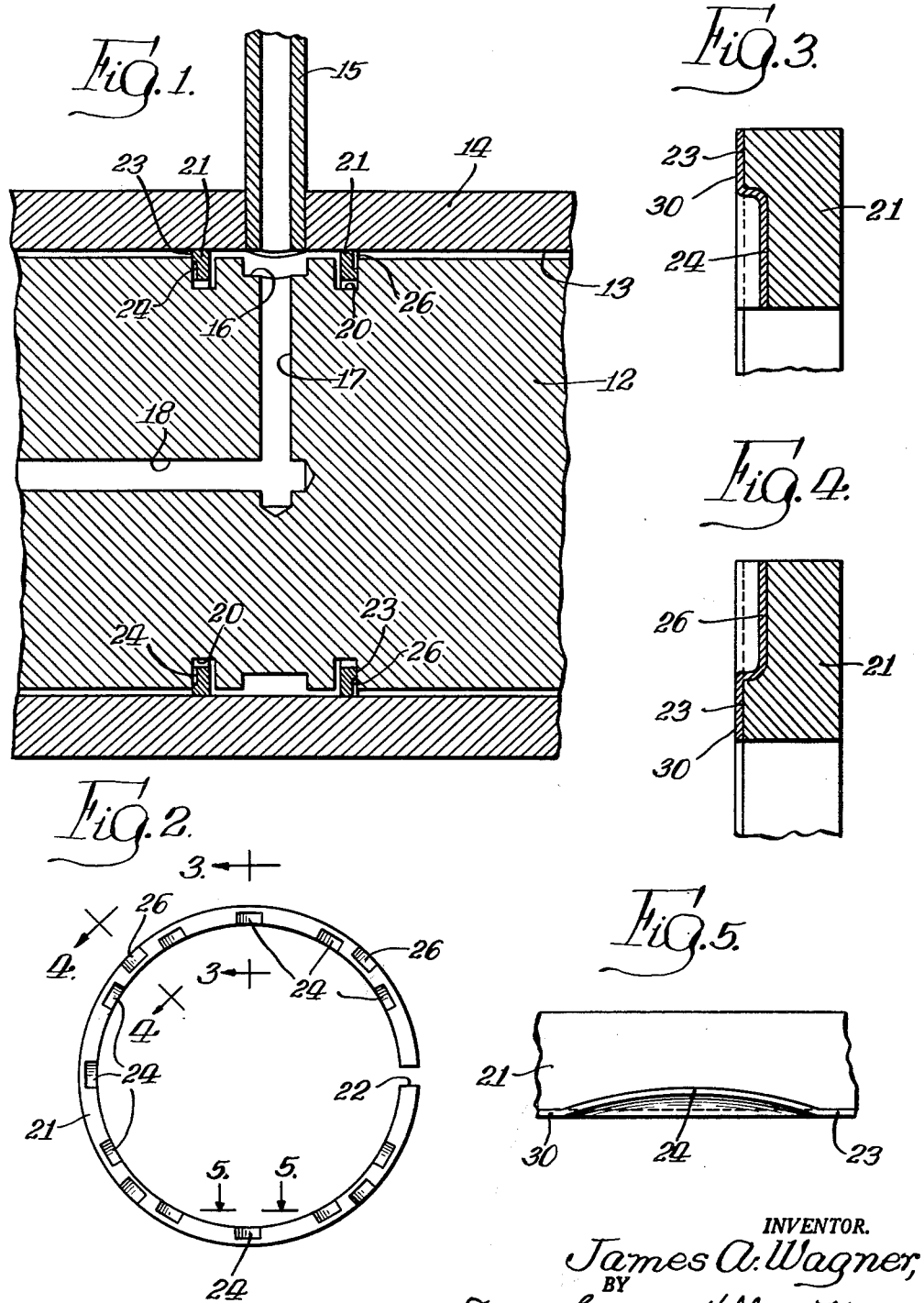

3,186,723
WEAR RESISTANT SEALING RING
James A. Wagner, Hagerstown, Ind., assignor, by mesne assignments, to Perfect Circle Corporation, Hagerstown, Ind., a corporation of Indiana
Filed Apr. 5, 1961, Ser. No. 100,862
1 Claim. (Cl. 277—59)

The present invention relates generally to a sealing ring and more particularly to a ring for sealing relatively rotating parts.

A great many ring structures have been devised to prevent leakage of fluid between relatively moving parts particularly where high fluid pressures are encountered. The problem of providing a fluid seal is also particularly great where one part is rotatably movable with respect to another part at high speeds, as there is a pronounced tendency for the contacting surfaces of the seal and the part moving relative thereto to wear excessively.

It has been proposed heretofore to provide a sealing ring of the type under consideration with indentations on the side of the ring which form a sliding contact with one of the relatively moving parts. These prior art sealing rings, however, have not been entirely satisfactory, since they have either provided too little lubricating fluid for satisfactory lubrication and flushing away of foreign particles which cause excessive wear between the relatively moving surfaces, or they have allowed too much fluid to pass outwardly between the moving parts resulting in excessive leakage of fluid.

It is therefore an important object of the present invention to provide an improved sealing ring for sealing relatively rotating parts against excessive leakage of fluid therebetween, while at the same time minimizing wear of the sealing ring and the relatively rotating part.

It is a further object of the present invention to provide an economical wear resistant sealing ring for a rotating shaft, which prevents excessive leakage of fluid under pressure between the relatively rotating ring and shaft.

Other objects of the present invention will be apparent to those skilled in the art from the following detailed description and claim when read in conjunction with the accompanying drawing wherein:

FIG. 1 is a fragmentary sectional view of sealing rings of the present invention in operative association with a rotating shaft and housing;

FIG. 2 is a plan view of the sealing ring shown in FIG. 1;

FIG. 3 is an enlarged sectional view taken along the line 3—3 of FIG. 2;

FIG. 4 is an enlarged sectional view taken along the line 4—4 of FIG. 2; and

FIG. 5 is an enlarged fragmentary elevational view taken along the line 5—5 of FIG. 2.

Sealing rings embodying the present invention are adapted for use in connection with two relatively rotating parts, for example, a rotating shaft mounted in a housing, with the latter containing a radial passage for supplying fluid such as oil under pressure to a passage in the shaft. The shaft on axially opposite sides of the passages is provided with circumferential grooves, and the sealing rings are mounted in the grooves and expand into engagement with the housing, the pressure of the fluid forcing the sealing rings into engagement with the sides of the grooves.

Each sealing ring has formed, on the side surface of the ring in sliding contact with the groove, a plurality of circumferentially spaced relatively shallow recesses which extends radially in the side surface of the ring a distance less than the width of the sealing ring and preferably a distance greater than one-half the width of the ring. In the preferred form of the present invention, certain of the recesses extend inwardly from the outer periphery of the ring and the other recesses extend outwardly from the inner periphery. The outwardly and inwardly extending recesses cooperate in a novel manner to substantially reduce the frictional wear between the ring and the relatively rotating part. Thus, the recesses which extends outwardly from the inner periphery and which are in continuous communication with oil under pressure, provide a lubricating hydrodynamic film between the side of the relatively rotating ring and the side of the groove as the latter rotatably moves across the pools of oil in the recesses. The recesses are so shaped as to form wedges of oil, the oil being carried to the portions of the side of the ring between the spaced recesses. The pressure of the film and the oil in these recesses also serves to partially unload or counterbalance the pressure on the ring from the opposite or high pressure side thereof, since the pressure of the film and the oil in these recesses acts in the opposite direction to that applied on the other side of the ring.

The recesses extending inwardly from the outer periphery coact with the first-mentioned recesses by providing means for flushing out excess oil that lies between the sealing ring and the groove and simultaneously carry away foreign particles which tend to increase ring wear.

In the drawing, a pair of expanding type sealing rings embodying the invention are shown as being used in connection with a rotating shaft 12 mounted in a cylindrical bore 13 of a housing 14 having means such as a tube 15 for supplying oil under pressure to passages in the shaft 12. Thus, the shaft is shown as having a circumferential groove 16 aligned with the tube 15 and providing a fluid reservoir. Extending inwardly in the shaft from the groove 16 is a radial passage 17 connected to an axially extending passage 18 for conveying fluid for operating a clutch mechanism or like apparatus associated with the shaft 12.

The shaft 12 and the bore 13 of the housing usually have some clearance therebetween, which would permit excessive leakage of oil along the bore, and to prevent such leakage the sealing rings embodying the invention are provided. Thus, one of the relatively rotating parts, in this instance the shaft 12, is provided with a pair of circumferential grooves 20 spaced axially from and on the respective sides of the groove 16. The sealing rings, indicated generally at 21, are mounted in the grooves 20 and each ring is adapted to engage one side of the groove and the bore 13 of the housing 14 in sealing engagement therewith.

Each sealing ring 21 is of generally rectangular cross section and the groove 20 in which it is mounted has an axial width greater than the thickness of the ring 21 and a depth sufficient to provide a space between the bottom of the groove 20 and the inner periphery of the ring. The ring is provided with a gap 22 and is adapted to expand resiliently into engagement with the bore 13 of the housing. The fluid under pressure entering the clearance between the shaft 12 and the bore 13 from the reservoir 16 passes into each groove 20 and behind the ring to augment the expansive force of the ring to hold the ring 21 in sealing and substantially non-rotative engagement with the housing 14. At the same time, the fluid pressure moves each ring 21 axially away from the fluid reservoir 16 so that its outer side surface 23 is in sealing but rotative engagement with the outer side surface of the groove 20. Since the ring 21 is substantially stationary with respect to the bore 13, there is little wear on the outer periphery of the ring. The ring 21, however, would be subjected to substantial wear on the side surface 23 thereof because of the relative rotation between the surface 23 and the adjacent surface of the groove.

In order to reduce the wear on these two relatively rotating surfaces, the surface 23 of the ring is provided with a plurality of circumferentially spaced shallow scallops or recesses 24 as shown in FIG. 5 of the drawing. The recesses 24 extend from the inner periphery of the ring radially outwardly a distance less than the width of the ring and preferably greater than half the distance between the inner and outer peripheries thereof. The recesses 24 are at all times in direct communication with the reservoir 16 so that they are supplied with oil at substantially the pressure of the oil in the reservoir. The side surface 23 also has formed therein additional shallow scallops or recesses 26 which extend radially inward from the outer periphery of the ring a distance less than the width of the ring and preferably greater than half the distance between the inner and outer peripheries of the side 23.

The recesses 24 preferably are so shaped that the oil under pressure therein will be drawn into the circumferential spaces between the recesses so that the side 23 of the ring and the adjacent side of the groove 20 are adequately lubricated. Thus, each recess 24 has a shape adapted to form a wedge of oil in which the pressure feeds the oil into the flat spaces between the recesses to form a film between the ring and the side of the groove. To this end, each recess 24 is generally arcuate in shape circumferentially of the ring, as shown in FIG. 5. Such shape may be readily formed, for example, by a grinding wheel positioned with its axis extending radially of the ring, whereby the surface of the ring in each recess comprises substantially a portion of a cylinder with the axis of the cylinder extending radially of the ring. The film of oil between the ring and the adjacent side of the groove greatly reduces the wear on these surfaces. Moreover, the pressure of the film of oil and the pressure of the oil in the recesses 24 partially counterbalances the pressure on the opposite side of the ring. Thus, the load forcing the ring toward the side of the groove is decreased and wear therebetween is further minimized.

The recesses 26, which may be of the same shape as the recesses 24, open to the outer periphery of the ring and hence communicate with the lower pressure area of the clearance between the bore 13 and the shaft. Thus, excess oil working outwardly from the side of the ring will pass into the recesses 26 and flush away foreign particles that would otherwise cause wear of the ring and the adjacent side of the groove.

The recesses 24 are preferably equally spaced on the side of the ring, with the specific spacing of the recesses for any particular apparatus being determined by the diameter of the ring, the speed of rotation of the shaft, and the pressure of the fluid in the groove 20. In general, as the diameter of the ring, the speed of rotation of the shaft 12, and the pressure of the fluid in the groove increases, the angular displacement between the successive recesses decreases. The recesses 26 are placed as required between the recesses 24 and are generally fewer in number than the recesses 24.

Each ring 21 may be provided, if desired, with a coating of material which serves as a lubricant in addition to the lubrication provided by the oil, particularly during the break-in period of the ring. Thus, the ring may be coated with a film of molybdenum disulfide, indicated at 30 in FIGS. 3, 4 and 5. Preferably such coating is applied to the ring after the recesses 24 and 26 have been formed therein and all other machining of the ring has been completed. The molybdenum disulfide is an excellent lubricant while it remains on the side surface 23 of the ring, which is in contacting relative rotative relationship with the side of the groove 20, and helps to break in the ring and reduce wear of the contacting parts.

The molybdenum disulfide deposited in the recesses 24 obviously will not wear away at the same rate as that on the groove-contacting surface. Thus, even after the molybdenum disulfide has disappeared from the groove-contacting surface of the ring, the oil fed into the spaces between the recesses 24 and 26 will pick up a small amount of molybdenum disulfide from the recesses 24 and convey the molybdenum disulfide to such spaces. It will also be apparent that the oil or other fluid will also pick up a small amount of molybdenum disulfide from other surfaces on the coated ring in addition to that from the recesses 24. In this way, the groove-contacting surface of the ring 21 is lubricated for a prolonged period after the molybdenum disulfide initially placed on such surface is worn off.

The molybdenum disulfide can be applied to the surface of the sealing ring 21 by any method which is suitable for applying the compound to a metal surface. One method found to be particularly satisfactory comprises applying, preferably by spraying, molybdenum disulfide in an epoxy resin which acts as both a carrier and a binding agent for the molybdenum disulfide. The composition comprising molybdenum disulfide and an epoxy resin is available as a commercial product which is sold under the trade name "Poxy Lube." It is also possible, of course, to apply the molybdenum disulfide by other methods.

It is also possible to include with the molybdenum disulfide, if desired, various additives which are often used therewith to increase the load carrying capacity thereof, such as antimony sulfide and tin sulfide.

I claim:

A sealing ring for preventing excess leakage of fluid between relatively rotating parts and adapted to be mounted in a circumferential groove in one of said parts and to resiliently grip the other of said parts, said groove being in communication with a source of lubricating fluid under pressure, said sealing ring having one side thereof adapted to be forced by the lubricating fluid pressure into slidable and sealing engagement with one side of said groove, said side of said ring being provided with a plurality of circumferentially spaced recesses to receive said lubricating fluid and to feed the lubricating fluid to the spaces on said side of the ring between said recesses, at least said side of said sealing ring including said recesses being provided with a coating of molybdenum disulfide, coating said side as well as the interior of said recesses without substantially filling said recesses, the molybdenum disulfide in said recesses being carried by said lubricating fluid to said spaces for a prolonged period of time after said coating on said side of the ring between said recesses has been worn off.

References Cited by the Examiner

UNITED STATES PATENTS

| | | | |
|---|---|---|---|
| 403,808 | 5/89 | Weatherburn | 288—2 |
| 2,162,218 | 6/39 | Hill | 286—19.1 |
| 2,402,033 | 6/46 | Flinn | 277—96 |
| 2,505,391 | 4/50 | Fletcher | 286—9.1 |
| 2,905,512 | 9/59 | Anderson | 277—227 |
| 3,062,599 | 11/62 | Campbell | 308—239 |

FOREIGN PATENTS 574,210   4/33   Germany.

OTHER REFERENCES

Packing and Mechanical Seals Publication, The Crane Packing Co. (Morton Grove, Ill.), Aug. 12, 1959 (page 9 relied upon).

EDWARD V. BENHAM, *Primary Examiner.*

WALTER A. SCHEEL, SAMUEL ROTHBERG,
*Examiners.*